(12) United States Patent
Larsson

(10) Patent No.: US 6,342,093 B1
(45) Date of Patent: Jan. 29, 2002

(54) AIR DRIER ARRANGEMENT

(75) Inventor: Sven-Olof Larsson, Landskrona (SE)

(73) Assignee: Haldex Brake Products AB, Landskrona (SE)

( * ) Notice: Subject to any disclaimer, the term of this patent is extended or adjusted under 35 U.S.C. 154(b) by 0 days.

(21) Appl. No.: 09/446,209

(22) PCT Filed: Jun. 17, 1998

(86) PCT No.: PCT/SE98/01170

§ 371 Date: Feb. 28, 2000

§ 102(e) Date: Feb. 28, 2000

(87) PCT Pub. No.: WO98/57730

PCT Pub. Date: Dec. 23, 1998

(30) Foreign Application Priority Data

Jun. 17, 1998 (SE) .............................................. 9702353

(51) Int. Cl.[7] .............................................. B01D 53/26
(52) U.S. Cl. .............................. 96/397; 96/401; 96/417; 96/420
(58) Field of Search .......................... 96/397, 401, 405, 96/417, 420

(56) References Cited

U.S. PATENT DOCUMENTS

| | | | |
|---|---|---|---|
| 4,886,528 A | * 12/1989 | Aaltonen et al. | ............. 96/417 |
| 5,147,419 A | * 9/1992 | Schoofs et al. | |
| 5,688,308 A | * 11/1997 | Voigts | ......................... 96/420 |
| 5,858,034 A | * 1/1999 | Shida et al. | .................. 96/420 |

* cited by examiner

Primary Examiner—David A. Simmons
Assistant Examiner—Minh-Chau T. Pham
(74) Attorney, Agent, or Firm—Breiner & Breiner, L.L.C.

(57) ABSTRACT

An air drier arrangement including an air compressor (1), an air-drier (3) and air conduits (2, 4). In order to obtain favorable working conditions for the arrangement under different temperatures there is a switch-over valve (6) in a separate signal air pipe (5) from the air drier to the compressor. This valve is operable between a first position, giving a governor mode for the arrangement, and a second position, giving an unloader mode for the arrangement. The operations of the valve may be governed by a thermostat (9).

4 Claims, 1 Drawing Sheet

AIR DRIER ARRANGEMENT

TECHNICAL FIELD

Figure 1:
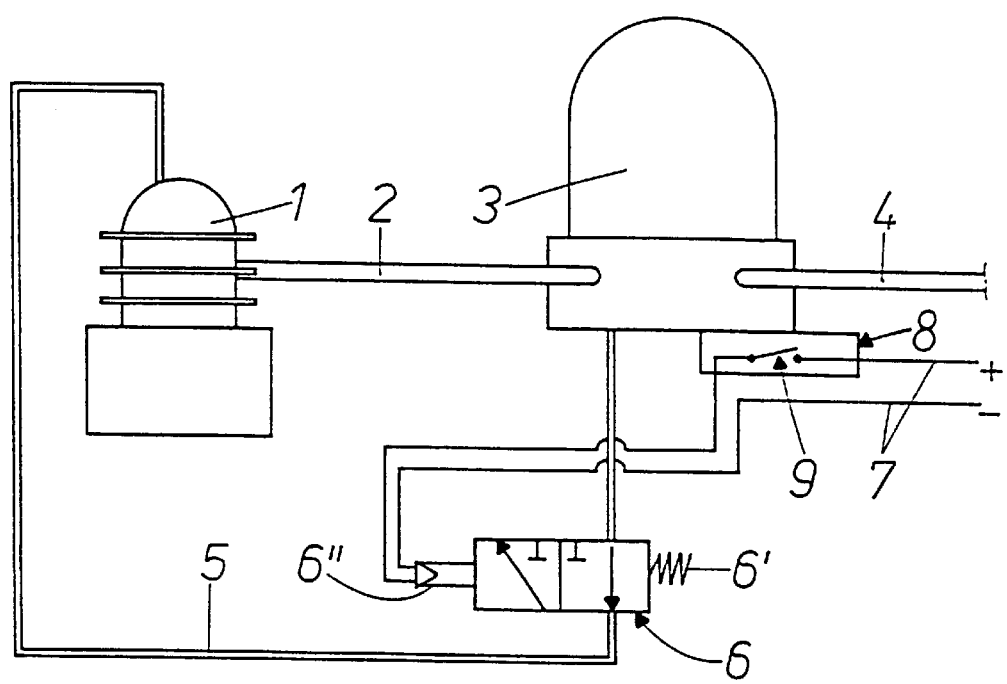

The present invention relates to an air drier arrangement, comprising an air compressor, an air drier, an air conduit from the compressor to the air drier and an air conduit from the air drier to an air tank or an air consumer.

BACKGROUND OF THE INVENTION

It is generally known that it is important to keep the inlet temperature to an air drier within a certain span, for example +4–+65° C., but actually as low as possible. In many applications, when a so called governor mode for the control of the arrangement is used, this leads to problems with freezing in the air conduit between the compressor and the air drier.

Namely, in the governor mode the air flow stops, when the compressor is unloaded, leading under certain circumstances to a temperature drop below the freezing point. One advantage with this mode, however, is its energy saving ability.

When on the other hand a so called on-line unloader mode for the control of the arrangement is used, non-pressurized air blows through said conduit from the compressor and out to the atmosphere via the unloader valve of the air drier, when the arrangement is unloaded.

From an energy conserving viewpoint this system has disadvantages, but said conduit is always kept at an even temperature, most often above the freezing point also at low temperatures. Further, the conduit and the air drier are blown clean from water that can freeze to ice.

THE INVENTION

The object of the invention is to combine the advantages of the two well-known control modes described above. This is according to the invention attained in that in a separate signal air pipe from the air drier to the compressor there is a switch-over valve, operable between a first position, in which air passes through the valve for accomplishing a governor mode for the arrangement, and a second position, in which the air pipe from the air drier is closed and the air pipe to the compressor is open to the atmosphere for accomplishing an unloader mode for the arrangement.

In a preferred embodiment the valve is a 3/2 way valve, which is spring biased to the first position and automatically may be brought to the second position by means of an electrically energized solenoid controlled by a thermostat device.

THE DRAWING

The invention will be described in further detail below reference being made to the accompanying drawing, in which FIG. 1 schematically illustrates an air drier arrangement embodying the invention.

DETAILED DESCRIPTION OF THE EMBODIMENTS

An air drier arrangement shown in FIG. 1 has an air compressor 1 supplying pressurized air through an air conduit 2 to an air drier 3, from which dried and cleaned air is supplied in an air conduit 4 to an air tank (not shown) and further to air consuming devices, for example in a vehicle, in which the arrangement is mounted.

The compressor 1 and the air drier 3 are conventional and are not further described. The air drier 3 is shown as being of the single-tower type but may alternatively be of the two-tower type.

The arrangement shown in the Figure is basically of the known so called governor type, which means that the air flow from the compressor 1 ceases in its unloaded state, i e when no further air is needed.

For accomplishing this function there is a signal air pipe 5 from the air drier 3 to the compressor 1.

By working in the governor mode the arrangement saves energy in that the compressor 1 only works when more air is needed. However, the damp air in the air conduit 2 between the compressor 1 and the air drier 3 may under certain circumstances freeze with serious consequences for the arrangement.

By incorporating an electrically operated valve 6 in the pipe 5 the arrangement may functionally be converted to work in an on-line unloader mode when needed.

In such a mode non-pressurized air is transported through the air conduit 2 from the compressor 1 to the air drier 3 and out into the atmosphere through the unloader valve of the air drier 3. In the unloader mode the arrangement is more energy consuming but keeps the conduit at a constant temperature preventing the air from freezing. In addition, the conduit 2 and the air drier 3 are kept clean from any water, which can freeze.

The valve 6 is a so called 3/2 way valve and is biased by a spring 6' into the position shown in FIG. 1, in which air can be conducted from the air drier 3 through the air pipe 5 to the compressor 1. With the valve 6 in this position the arrangement will work in the governor mode.

By electrically energizing a coil 6" of the valve 6 it is switched over into its second position, in which the portion of the air pipe 5 closest to the air drier 3 is closed and the portion of the air pipe 5 leading to the compressor 1 is open to the atmosphere. With the valve 6 in this position the arrangement will work in the unloader mode.

The energizing of the valve coil 6" can be performed manually, when the temperature drops under a certain level, but the function can of course also easily be automated. An example thereof is shown in FIG. 1.

Electric energy is supplied to the valve solenoid 6" through electric lines 7 from the battery of the vehicle (if the arrangement is mounted on a vehicle). The lines 7 are drawn through a box 8 at the underside of the air drier 3 containing a thermostat 9, which is normally open but which closes at a temperature below a certain value, for example +4° C., for energizing the valve coil 6" and thus for switching over from the governor to the unloader mode for the arrangement.

Other possibilities include the provision of a valve with a built-in temperature sensor, for example a bimetallic sensor. It would also be possible to make use of an enclosed fluid, which is very volume-expansive with rising temperature, at the valve.

What is claimed is:

1. An air drier arrangement comprising an air compressor, an air drier, a first air conduit from the air compressor to the air drier, a second air conduit from the air drier to an air tank or an air consuming device, and a separate signal air pipe from the air drier to the air compressor including a switch-over valve operable between a first position in which air passes through the switch-over valve in a governor mode wherein air flow from the air compressor ceases in an unloaded state, and a second position in which the signal air pipe from the air drier is closed and the signal air pipe to the air compressor is open to the atmosphere in an unloader mode wherein non-pressurized air is transported through the first air conduit from the air compressor to the air drier and out into the atmosphere through an unloader valve.

2. An arrangement according to claim 1, wherein said switch-over valve is a 3/2 way valve spring-biased to the first position.

3. An arrangement according to claim 2, wherein said switch-over valve is brought to the second position by means of an electrically energized solenoid.

4. An arrangement according to claim 3, wherein said solenoid is governed by a thermostat.

* * * * *

UNITED STATES PATENT AND TRADEMARK OFFICE
CERTIFICATE OF CORRECTION

PATENT NO. : 6,342,093 B1
DATED : January 29, 2002
INVENTOR(S) : Sven-Olof Larsson It is certified that error appears in the above-identified patent and that said Letters Patent is hereby corrected as shown below:

<u>Title page,</u>
Item [30],
"Jun. 17, 1998 (SE) ............ 9702353" should read
-- Jun. 19, 1998 (SE) ............. 9702353 --.

Signed and Sealed this

Seventeenth Day of September, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.    : 6,342,093 B1
DATED         : January 29, 2002
INVENTOR(S)   : Sven-Olof Larsson It is certified that error appears in the above-identified patent and that said Letters Patent is hereby corrected as shown below:

<u>Title page,</u>
Item [30], Foreign Application Priority Data,
"Jun. 17, 1998  (SE) ............ 9702353" should read
-- Jun. 19, 1997 (SE) ............. 9702353 --.

Signed and Sealed this

Twenty-fourth Day of June, 2003

JAMES E. ROGAN
*Director of the United States Patent and Trademark Office*